(12) United States Patent  
Lee et al.

(10) Patent No.: US 9,256,288 B2  
(45) Date of Patent: Feb. 9, 2016

(54) APPARATUS AND METHOD FOR SELECTING ITEM USING MOVEMENT OF OBJECT

(75) Inventors: Dong-ho Lee, Seoul (KR); Hee-seob Ryu, Hwaseong-si (KR); Seung-kwon Park, Yongin-si (KR); Seong-hun Jeong, Suwon-si (KR); Jong-bo Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 236 days.

(21) Appl. No.: 13/298,871

(22) Filed: Nov. 17, 2011

(65) Prior Publication Data

US 2012/0131518 A1 May 24, 2012

(30) Foreign Application Priority Data

Nov. 22, 2010 (KR) .......................... 10-2010-0116067

(51) Int. Cl.
| | |
|---|---|
| *G06F 3/00* | (2006.01) |
| *G06F 3/01* | (2006.01) |
| *G06F 3/03* | (2006.01) |
| *G06F 3/042* | (2006.01) |
| *G06F 3/0346* | (2013.01) |
| *G06F 3/0484* | (2013.01) |
| *G06F 3/0481* | (2013.01) |

(52) U.S. Cl.
CPC ................. *G06F 3/017* (2013.01); *G06F 3/011* (2013.01); *G06F 3/0304* (2013.01); *G06F 3/0346* (2013.01); *G06F 3/042* (2013.01); *G06F 3/04812* (2013.01); *G06F 3/04842* (2013.01)

(58) Field of Classification Search
USPC .......... 715/863, 856, 700, 739, 771; 345/156, 345/158, 157
See application file for complete search history.

(56) References Cited

U.S. PATENT DOCUMENTS

| | | | |
|---|---|---|---|
| 6,782,141 B1 * | 8/2004 | Coleman et al. .............. | 382/291 |
| 7,227,526 B2 | 6/2007 | Hildreth et al. | |
| 7,479,949 B2 * | 1/2009 | Jobs et al. ..................... | 345/173 |

(Continued)

FOREIGN PATENT DOCUMENTS

KR 10-2008-004346 A 5/2008

OTHER PUBLICATIONS

Communication issued on Jun. 11, 2015 by the European Patent Office in related Application No. 11185921.1.

(Continued)

*Primary Examiner* — Amy Ng  
*Assistant Examiner* — Toan Vu  
(74) *Attorney, Agent, or Firm* — Sughrue Mion, PLLC

(57) ABSTRACT

An item selecting apparatus includes a movement detecting unit detecting a movement of a user, a screen displaying image information, a display image storage unit storing data to generate an image to be displayed on the screen, a display image generating unit generating an image to be displayed on the screen, and a control unit controlling so that a plurality of items is displayed on the screen in one of one-, two- and three-dimensional arrangements, in which the control unit receives a signal from the movement detecting unit to measure a movement of the object in at least one of x-, y- and z-axis directions and issues a command to select at least one from among the plurality of items or provides visual feedback thereto, in response to the measured movement of the user and in accordance with the arrangement of the plurality of items on the screen.

16 Claims, 14 Drawing Sheets

(56) References Cited

U.S. PATENT DOCUMENTS

| | | | |
|---|---|---|---|
| 8,166,421 B2* | 4/2012 | Magal et al. | 715/863 |
| 8,558,787 B2* | 10/2013 | Kumagai et al. | 345/156 |
| 8,897,499 B2* | 11/2014 | Rekimoto | 382/115 |
| 2001/0050672 A1* | 12/2001 | Kobayashi | 345/158 |
| 2004/0193413 A1* | 9/2004 | Wilson et al. | 704/243 |
| 2005/0243062 A1* | 11/2005 | Liberty | 345/158 |
| 2006/0010400 A1* | 1/2006 | Dehlin et al. | 715/856 |
| 2006/0028446 A1* | 2/2006 | Liberty et al. | 345/158 |
| 2006/0164386 A1* | 7/2006 | Smith et al. | 345/156 |
| 2007/0040800 A1* | 2/2007 | Forlines et al. | 345/158 |
| 2007/0057912 A1* | 3/2007 | Romriell et al. | 345/156 |
| 2007/0113207 A1* | 5/2007 | Gritton | 715/863 |
| 2007/0283261 A1* | 12/2007 | Harrison | 715/700 |
| 2008/0013793 A1* | 1/2008 | Hillis et al. | 382/114 |
| 2008/0100572 A1 | 5/2008 | Boillot | |
| 2008/0126937 A1* | 5/2008 | Pachet | 715/720 |
| 2009/0073117 A1* | 3/2009 | Tsurumi et al. | 345/158 |
| 2009/0113354 A1* | 4/2009 | Yun et al. | 715/863 |
| 2009/0201249 A1* | 8/2009 | Yamamoto | 345/157 |
| 2009/0217210 A1* | 8/2009 | Zheng et al. | 715/863 |
| 2010/0058227 A1* | 3/2010 | Danton et al. | 715/786 |
| 2010/0095206 A1 | 4/2010 | Kim | |
| 2010/0169843 A1* | 7/2010 | Yamamoto et al. | 715/863 |
| 2010/0192099 A1* | 7/2010 | Takagi | 715/828 |
| 2010/0231509 A1* | 9/2010 | Boillot et al. | 345/156 |
| 2010/0238137 A1 | 9/2010 | Han et al. | |
| 2010/0304868 A1* | 12/2010 | Zalewski | 463/38 |
| 2010/0315336 A1* | 12/2010 | Butler et al. | 345/158 |
| 2011/0057875 A1* | 3/2011 | Shigeta et al. | 345/156 |
| 2011/0074669 A1* | 3/2011 | Marks et al. | 345/156 |
| 2011/0173574 A1* | 7/2011 | Clavin et al. | 715/863 |
| 2011/0267265 A1* | 11/2011 | Stinson | 345/157 |
| 2011/0276891 A1* | 11/2011 | Ecko | 715/739 |
| 2011/0289455 A1* | 11/2011 | Reville et al. | 715/830 |
| 2011/0296353 A1* | 12/2011 | Ahmed et al. | 715/848 |
| 2012/0039507 A1* | 2/2012 | Ikenoue | 382/103 |
| 2012/0086630 A1* | 4/2012 | Zhu et al. | 345/156 |
| 2012/0119989 A1* | 5/2012 | Van Den Brink | 345/157 |
| 2012/0162065 A1* | 6/2012 | Tossell et al. | 345/156 |
| 2012/0249767 A1* | 10/2012 | Matsubara et al. | 348/77 |
| 2014/0035805 A1* | 2/2014 | Minnen et al. | 345/156 |
| 2014/0043230 A1* | 2/2014 | Galor et al. | 345/156 |
| 2014/0043234 A1* | 2/2014 | Eilat et al. | 345/158 |
| 2014/0053115 A1* | 2/2014 | Perski et al. | 715/863 |
| 2014/0078318 A1* | 3/2014 | Alameh | 348/207.99 |
| 2014/0145942 A1* | 5/2014 | Kuno et al. | 345/156 |
| 2014/0215407 A1* | 7/2014 | Ahmed et al. | 715/850 |
| 2014/0316763 A1* | 10/2014 | Tardif | 704/3 |

OTHER PUBLICATIONS

Choumane et al., "Buttonless Clicking: Intuitive Select and Pick-release Through Gesture Analysis", Virtual Reality Conference (VR), Mar. 20, 2010, 4 total pages.

* cited by examiner

APPARATUS AND METHOD FOR SELECTING ITEM USING MOVEMENT OF OBJECT

CROSS-REFERENCE TO RELATED APPLICATIONS

This application claims priority from Korean Patent Application No. 10-2010-0116067, filed on Nov. 22, 2010, in the Korean Intellectual Property Office, the disclosure of which is incorporated herein by reference in its entirety.

BACKGROUND OF THE INVENTION

1. Field of the Invention

Apparatuses and methods consistent with the disclosure provided herein relate to selecting an item, and more particularly, to selecting a desired item from among a plurality of items displayed on a screen.

2. Description of the Related Art

A user interface (UI) typically provides temporary or continuous access to enable a user to communicate with objects, systems, devices or programs, or the like. A UI may include a physical or virtual medium. Generally, a UI may be divided into an input at which a user operates a system and an output at which the response or result to the input to the system is indicated.

The input typically requires an input apparatus to move a cursor, or acquire a manipulation of a user to select a specific object. The output typically requires an output apparatus to operate so that the user can confirm the response to his input with visual, auditory, or touch sensation.

Recently, to provide more convenience to users of devices including televisions and game consoles, a technology to provide a reaction of a UI in response to movement of the user which is input at a remote distance and recognized as an input, has been researched. According to the technology, it is possible to select a desired item from among a plurality of items displayed on a screen, using a UI.

SUMMARY OF THE INVENTION

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

An aspect of the present invention provides an item selecting apparatus which may include: a movement detecting unit which may detect a movement of an object; and a control unit which controls a plurality of items to be displayed on a screen in one of one-dimensional, two-dimensional and three-dimensional arrangements, wherein the control unit may receive a signal from the movement detecting unit and measures the movement of the object in at least one of x-axis, y-axis and z-axis directions, and wherein in response to the measured movement, the control unit may output a command corresponding to one of a selection of at least one of the plurality of items and a visual feedback with respect to the at least one of the plurality of items according to the arrangement of the plurality of items on the screen.

If the plurality of items is arranged in the one-dimensional arrangement and the movement of the object is within a predetermined angle with respect to a direction of the one-dimensional arrangement, the control unit may output the command corresponding to the visual feedback with respect to the at least one item, and if the plurality of items is arranged in the one-dimensional arrangement and the movement of the object is not within the predetermined angle, the control unit may output the command corresponding to the selection of the at least one item.

If changes in the movement of the object are maintained within a predetermined time from a time of outputting the command corresponding to the visual feedback, the control unit may output the command corresponding to the selection of the at least one item.

If the movement of the object corresponds to a predetermined pattern, the control unit may output the command corresponding to the selection of the at least one item.

If the plurality of items is arranged in the two-dimensional arrangement and the movement of the object is in the x-axis and y-axis directions, the control unit may output the command corresponding to the visual feedback with respect to the at least one item, and if the plurality of items is arranged in the two-dimensional arrangement and the movement of the object is in the z-axis direction, the control unit may output the command corresponding to the selection of the at least one item.

If changes in the movement of the object are maintained within a predetermined time from a time of outputting the command corresponding to the visual feedback, the control unit may output the command corresponding to the selection of the at least one item.

If the movement of the object corresponds to the predetermined specific pattern, the control unit may output the command corresponding to the selection of the at least one item.

If the plurality of items is arranged in the three-dimensional arrangement, the control unit may output the command corresponding to the visual feedback with respect to the at least one item in response to the movement of the object, and if changes in the movement of the object are maintained within a predetermined time from a time of the outputting of the command corresponding to the visual feedback, the control unit may output the command corresponding to the selection of the at least one item and if the movement of the object corresponds to a predetermined specific pattern, the control unit may output the command corresponding to the selection of the at least one item.

If the measured movement of the object is faster than a predetermined reference speed, the control unit may control the screen to display a second plurality of items, and may output a second command corresponding to second visual feedback with respect to at least one of the second plurality of items.

If the visual feedback is arranged on an edge of the screen and if the measured movement moves toward the edge of the screen, the control unit may control the screen to display a second plurality of items, and the controller may output a command corresponding to second visual feedback with respect to at least one of the second plurality of items.

Another aspect of the present invention provides an item selecting apparatus which may include: a screen which may display a plurality of items; and a control unit which may display the plurality of items on the screen in a one-dimensional arrangement, wherein the control unit may measure a movement of an object, and if the movement of the object is within a predetermined angle with respect to an arrangement of the plurality of items, the controller may control the screen to provide visual feedback with respect to at least one item of the plurality of items, and wherein if the movement of the object deviates from the predetermined angle with respect to the arrangement of the plurality of items, the controller may select the at least one item of the plurality of items.

The control unit may receive a signal from a movement detecting unit which may generate the signal in response to the movement of the object.

The movement detecting unit may include a vision sensor which photographs the object and acquires an image frame.

The movement detecting unit may include a remote controller including at least one of an inertial sensor, a motion sensor, an accelerometer and an optical sensor. Another aspect of the present invention provides a method for selecting at least one item from among a plurality of items displayed on a screen, wherein the method may include: displaying a plurality of items on the screen in one of one-dimensional, two-dimensional and three-dimensional arrangements, detecting a movement of an object; and measuring the detected movement of the object in at least one of x-axis, y-axis and z-axis directions, and in response to the measured movement, performing one of issuing a command to select at least one of the plurality of items and providing visual feedback with respect to the at least one of the plurality of items according to an arrangement of the plurality of items on the screen.

If the plurality of items is arranged in the one-dimensional arrangement, the method may further include one of: providing the visual feedback with respect to the at least one item if the movement of the object is measured to be in a direction that falls within a predetermined angle with respect to a direction of arrangement, and selecting the at least one item if the movement of the object is measured to be in a direction that deviates from the predetermined angle with respect to the direction of arrangement.

The method may further include selecting the at least one item if changes in the movement of the object are maintained within a predetermined time from a time of providing the visual feedback.

The method may further include selecting the at least one item if the movement of the object corresponds to a predetermined specific pattern.

If the plurality of items is arranged in the two-dimensional arrangement, the method may further include: providing the visual feedback with respect to the at least one item if the movement of the object is in the x-axis and the y-axis directions; and selecting the at least one item if the movement of the object is in z-axis direction.

The method may further include selecting at least one item if changes in the movement of the object are maintained within a predetermined time from a time of providing the visual feedback.

BRIEF DESCRIPTION OF THE DRAWINGS

The above and/or other aspects of the present inventive concept will be more apparent by describing certain exemplary embodiments of the present inventive concept with reference to the accompanying drawings, in which.

DETAILED DESCRIPTION OF EXEMPLARY EMBODIMENTS

Figure 1:
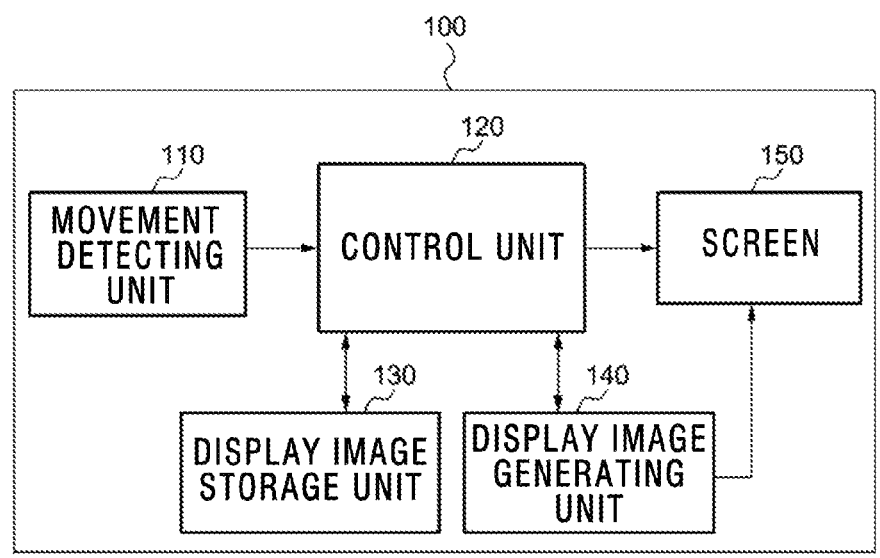
FIG. 1 illustrates configuration of an item selecting apparatus according to an exemplary embodiment.

Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

Further, a singular form used herein or in the accompanying claims is intended to include a plural form unless otherwise specified. Further, the expression 'and' used herein should be understood as encompassing every possible combination of one or more items of the listed related items.

FIG. 1 illustrates configuration of an item selecting apparatus according to an exemplary embodiment. Referring to FIG. 1, the item selecting apparatus 100 may include a movement detecting unit 110 which detects a movement of a user, a screen 150 which displays image information thereon, a display image storage unit 130 which stores therein data to generate image to be displayed on a screen, a display image generating unit 140 which generates an image to be displayed on the screen, and a control unit 120 which controls so that the plurality of items displayed on the screen is arranged one-, two-, or three-dimensionally. The control unit 120 may receive a signal from the movement detecting unit 110, measure the movement in at least one direction from among x, y and z axes of the object, and issue a command to select or provide visual feedback with respect to at least one item from among the plurality of items in response to the user's movement as measured and in accordance with the arrangement of the plurality of items on the screen.

The movement detecting unit 110 may be implemented as a means to receives an input of object's movement and acquire base data accordingly. The movement detecting unit 110 may generate an electric signal in accordance with the movement of the object. The electric signal may be an analog or digital signal. The operation detecting unit 110 may be a remote controller ('remocon') including at least one of inertial sensor, motion sensor, accelerometer and optical sensor. The remocon may generate an electric signal in response to a three-dimensional movement (in x, y and z axes) of the object. The object may be the user or a part of the user. If the user moves with holding the remocon in his hand, as a response, the inertial sensor of the remocon may generate an electric signal according to x, y or z-axis movement. The electric signal of x-, y- and z-axis operation may be transmitted to an item selecting apparatus via wired/wireless communication.

The movement detecting unit 110 may be a vision sensor. The vision sensor may photograph an object, and acquire image information including distance information between the vision sensor and the object. The vision sensor may be provided as a separate module or included in the item selecting apparatus.

The movement detecting unit 110 may acquire the location of the object. The location of the object may include at least one of coordinates in vertical direction on the image frame, coordinates in horizontal direction on the image frame and the depth information of the object which represents a distance between the object and the movement detecting unit 110. The depth information of the object may be expressed as a coordinate value with respect to a direction in perpendicular to the image frame. By way of example, the movement detecting unit 110 may photograph an object and acquire an image frame that contains depth information of the object. The image frame may be divided into a plurality of regions and at least two of the plurality of regions may have different thresholds. As the location of the object on the image frame, the movement detecting unit 110 may acquire coordinates in the vertical direction on the image frame, and coordinates in the horizontal direction on the image frame. The movement detecting unit 110 may also acquire depth information of the object which represents a distance between the object and the movement detecting unit 110. A depth sensor, two-dimensional camera, or three-dimensional camera including stereoscopic camera may be implemented as the movement detecting unit 110.

The control unit 120 may compute a size of the movement of the object using the image frame. The control unit 120 may detect the location and generate movement information corresponding to the movement of the object using the detected location. That is, the control unit 120 may generate movement information on the image frame based on the location so that a corresponding event occurs at each corresponding location in response to the movement of the object. The control unit 120 may also generate an event in response to the movement information.

The control unit 120 may detect the movements of the objects using at least one stored image frame or data regarding the locations of the objects. The control unit 120 may compute the size of the detected movement of the object. By way of example, the control unit 120 may compute the size of the movement based on a length of a line that connects the starting and ending points of the movement of the object, or by drawing an imaginary line based on average locations of the movements of the object and referring to the length of such imaginary line. If the movement of the object is acquired through a plurality of image frames, the location of the object may correspond to at least one location of the plurality of image frames that corresponds to the movement of the object, or to a center location which is acquired using at least one location of the plurality of image frames, or in consideration of time taken for movement in each region. By way of example, the location of the object may correspond to a location of the object on the first image frame of the object's movement, a location on the last image frame of the object's movement, or a center point between the above-mentioned two locations.

The control unit 120 may generate movement information based on the location of the object so that a corresponding event occurs in response to the movement of the object. According to an event, the control unit 120 may display a reaction to the movement of the object through a screen which displays a menu 220 of FIG. 2.

The operation of the respective components will be explained in greater detail below with reference to FIGS. 2 to 4.

Figure 2:
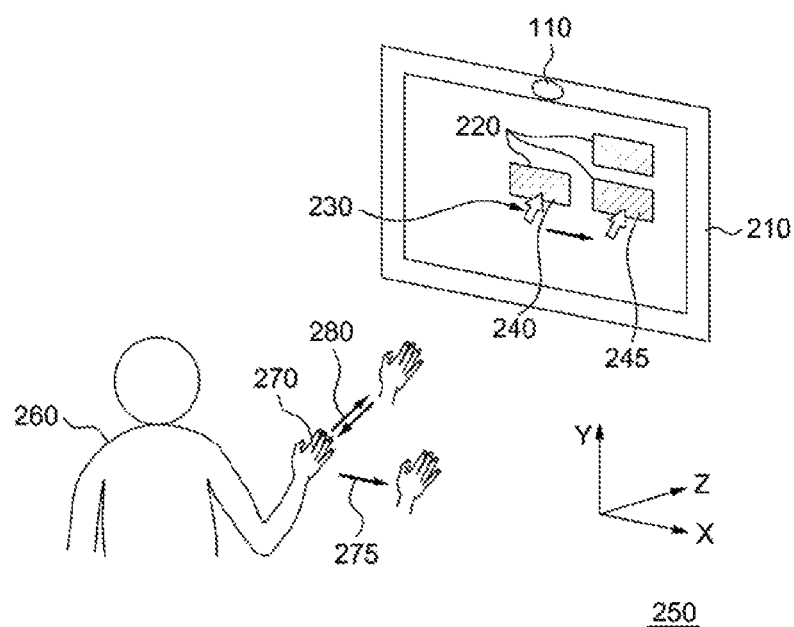
FIG. 2 is a view providing a reaction of a user interface (UI) to a movement of an object according to an exemplary embodiment.

The item selecting apparatus 210 of FIG. 2 may include a television, a game console and/or an audio player. The object may be a body of the user 260, a part of the body of the user 260, or a tool used by the user 260.

Figure 3:
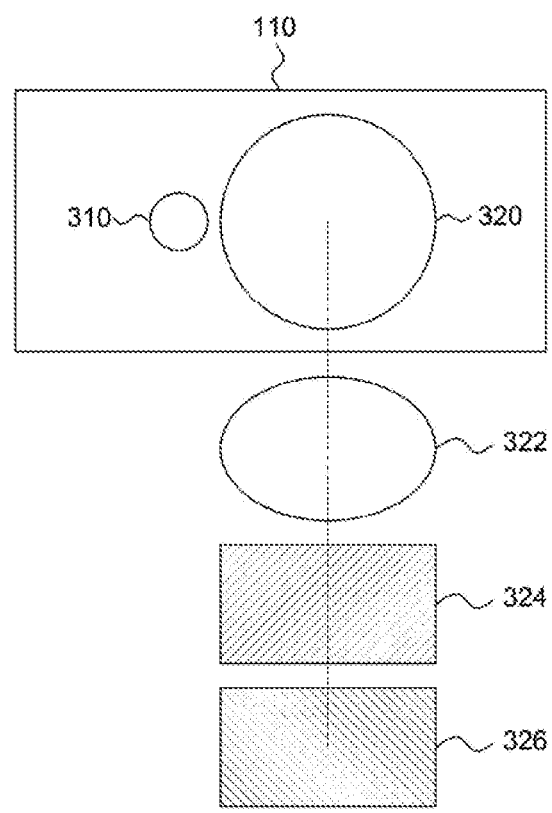
FIG. 3 is a view illustrating a sensor according to an exemplary embodiment.

FIG. 3 illustrates a depth sensor 110, an optical receiving unit 320, a lens 322, an infrared filter 324, and an image sensor 326 as sensors.

With reference to FIG. 3, the sensor 110 includes an infrared transmitting unit 310 and an optical receiving unit 320. The infrared transmitting unit 310 and the optical receiving unit 320 may be placed in an identical or an adjacent location with respect to each other. The sensor 110 may have a field of view as a unique value according to the optical receiving unit 320. The infrared ray which is transmitted through the infrared transmitting unit 310 is reflected after reaching the objects including an object placed at a front side thereof, and the reflected infrared ray may be transmitted to the optical receiving unit 320. The lens 322 receives the optical element of the objects, and the infrared filter 324 may penetrate the infrared ray among the received optical elements. The image sensor 326 may convert the penetrated infrared ray into an electric signal to obtain an image frame. For example, the image sensor 326 may be a Charge Coupled Device (CCD) or a Complementary Metal Oxide Semiconductor (CMOS), etc. At this time, the outline may be revealed according to the depth of the objects and each outline may be signal processed to include the depth information. The depth information may be acquired by using time of flight of the infrared ray transmitted from the infrared transmitting unit 310 to the optical receiving unit 320. In addition, an apparatus detecting the location of the object by receiving/transmitting the ultrasonic waves or the radio waves may also acquire the depth information by using the time of flight of the ultrasonic waves or the radio waves.

Figure 4:
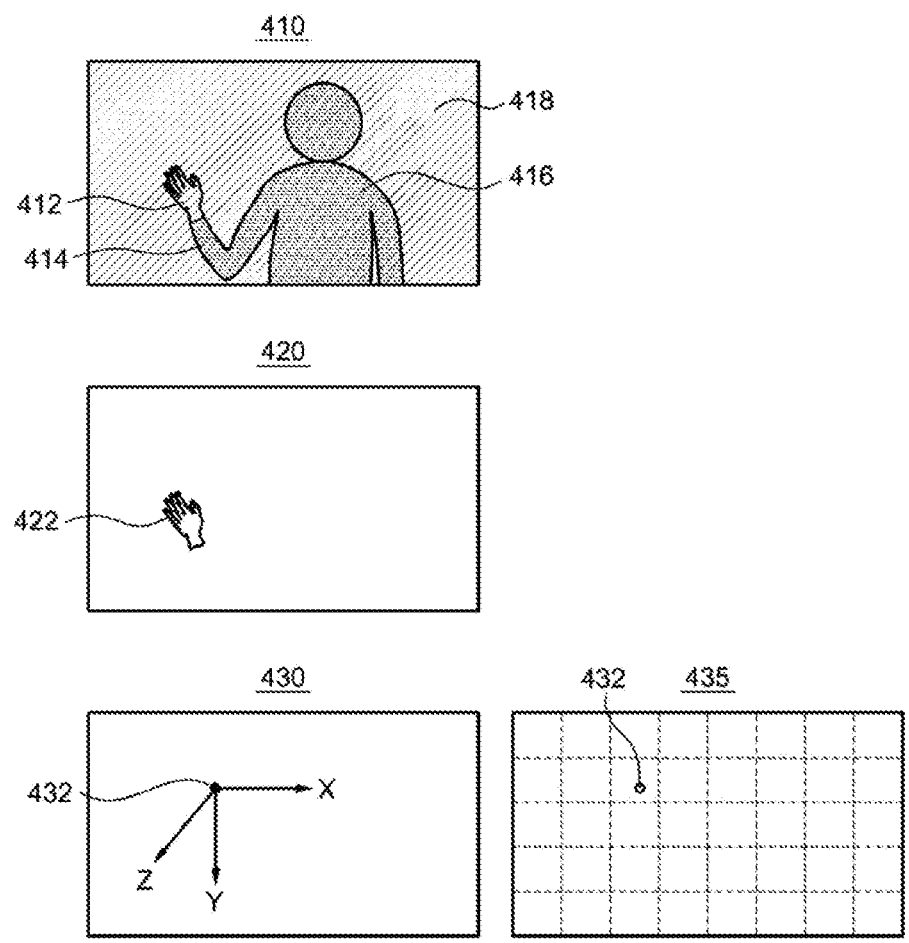
FIG. 4 is a view illustrating an image frame and an object on the image frame according to an exemplary embodiment.

The operation detecting unit 110 may acquire an image frame 410 of FIG. 4 that includes a hand 270 of the user 260. The vision sensor may be a part of the item selecting apparatus 210 or provided as a separate module. The image frame 410 may include contours of the objects having a specific range of depth that is similar to a contour map, and depth information corresponding to the contour. Contour 412 may correspond to the hand 270 of the user 260 on the image frame 410, and include depth information that represents a distance between the hand 270 and the operation detecting unit 110. Contour 414 may correspond to a part of a user's arm, and contour 416 may correspond to a head and upper part of the user 260. Contour 418 may correspond to a background in back of the user 260. The contours 412 to 418 may have different depth information.

The control unit 120 may detect the object and location of the object using the image frame 410. The control unit 120 may detect the object 412 on the image frame 410 from the image frame 410 and control so that the image frame 420 includes only the detected object 422. Further, the control unit 120 may control so that the object 412 has different forms on the image frame. By way of example, the control unit 120 may control so that the object 432 on the image frame 430 may be displayed as at least one dot, line or plane.

Further, the control unit 120 may cause the object 432 to be displayed as a dot on the image frame 430 and location of the object 432 to be displayed on three-dimensional coordinates. The three-dimensional coordinates may include x-, y- and z-axis components, in which x axis corresponds to the horizontal direction, and y axis corresponds to the vertical direction on the image frame. The z axis may correspond to a direction that is in perpendicular to the image frame, i.e., the value as expressed by the depth information.

The control unit 120 may trace the location of the object using at least two image frames and computes a size of the movement accordingly. Further, the control unit 120 may indicate the size of the movement of the object in x-, y- or z-axis component, respectively.

The control unit 120 may control so that the plurality of items on the screen is displayed in one of one-dimensional, two-dimensional and three-dimensional arrangements. The items displayed on the screen may be menu items, or content items. By way of example, the content may include a video image, a still image, or a music file. Further, by way of example, the content item may include a thumbnail image representing the video image, a thumbnail image representing the still image, a thumbnail image representing a broadcast channel, an album image representing the music file or an icon representing the file name.

The menu item and content item may be stored in the display image storage unit 130. By way of example, the display image storage unit 130 may be a computer-readable recording medium. Examples of the computer-readable recording medium includes magnetic media such as hard disks, floppy disks, or magnetic tapes, optical media such as CD-ROMs or DVDs, magneto-optical media such as floptical disks, or solid state memories such as ROMs, RAMs, or flash memories.

The control unit 120 may control so that an item is read out from the display image storage unit 130 and displayed on the screen in at least one of the one-dimensional, two-dimensional and three-dimensional arrangements. The control unit 120 may display the item on the screen 150 in one-dimensional, two-dimensional or three-dimensional arrangement without requiring a separate command from the user. The control unit 120 may determine the one-dimensional, two-dimensional and three-dimensional arrangements in accordance with the number of items to be displayed on the screen 150. By way of example, if 50 or less items are displayed on the screen 150, the control unit 120 may control so that the plurality of items is arranged one-dimensionally. If 300 or less items are displayed on the screen 150, the control unit 120 may control so that the items are arranged two-dimensionally. If 300 or less items are displayed on the screen, the control unit 120 may control so that the items are arranged three-dimensionally.

The item selecting apparatus may display the plurality of items on the screen only in one-dimensional arrangement. Alternatively, the item selecting apparatus may display the plurality of items on the screen only in two-dimensional arrangement. Alternatively, the item selecting apparatus may display the plurality of items on the screen only in three-dimensional arrangement.

Further, in some exemplary embodiments, the control unit 120 may display the items on the screen 150 in one of one-dimensional, two-dimensional and three-dimensional arrangements according to a display pattern as set by the user at an initial stage. By way of example, if the user selects one-dimensional arrangement, the plurality of items may be displayed on the screen 150 in one-dimensional arrangement, i.e., in x-, y- and diagonal directions. If the user selects two-dimensional arrangement, the plurality of items may be displayed on the screen 150 two-dimensionally. If the user selects three-dimensional arrangement, the plurality of items may be displayed on the screen 150 three-dimensionally.

The control unit 120 may receive a signal from the movement detecting unit 110 and measure a movement in at least one of x, y and z axes of the object. The signal output from the movement detecting unit 110 is inputted into the control unit 120, and the control unit 120 measures the movement of the object in three-dimensional space by analyzing the signal. The signal may include x-, y- or z-axis component, and the control unit 120 measures the signal at predetermined time intervals, measures changes in the values corresponding to the x-, y-, and z-axis components, and thus measures the movement of the object. The movement of the object may include a hand movement of the user. If the user moves his hand, the movement detecting unit 110 outputs a signal in response and the control unit 120 receives the signal and thus determine the changes in movement, direction and speed of the movement.

The control unit 120 may issue a command to select or provide a visual feedback with respect to at least one of the plurality of items in response to the measured movement and in accordance with the patterns of arrangement of the plurality of items on the screen 150. The control unit 120 determines, in response to detecting a movement of the object, if the plurality of items currently displayed on the screen is in one-dimensional, two-dimensional or three-dimensional arrangement. The control unit 120 may perceive the movement of the same object as the plurality of items or a command to select the item according to the result of determination. If the plurality of items is arranged one-dimensionally in x-axis, the control unit 120 may provide a visual feedback with respect to at least one of the plurality of items displayed on the screen in response to the movement in x-axis direction. By way of example, the visual feedback may include highlighting which indicates a corresponding item in a brighter color, or indicating in different color or size. For example, if the user moves his hand in x-axis direction, the control unit 120 may move the location of the highlighted item on the screen in accordance with the movement in the x-axis direction. The control unit 120 may control so that an item highlighted on the screen may be selected in response, if the user moves his hand in y-axis direction. The control unit 120 may control so that if an item is selected, sub-items of the selected item are displayed on the screen or content corresponding to the selected item is played back, or a broadcast channel corresponding to the selected item is selected.

Further, if the plurality of items is arranged one-dimensionally, the control unit 120 may provides a visual feedback with respect to at least one of the plurality of items if the movement of the object is measured to be in a direction within a predetermined angle with respect to the direction where the plurality of items is arranged, or select the at least one item if the movement f the object is measured to be in a direction that exceeds the predetermined angle with respect to the direction where the plurality of items is arranged.

The screen 150 may be a general display apparatus. By way of example, the display apparatuses such as LCD, CRT, PDP or the like may be implemented as the screen.

Figure 5:
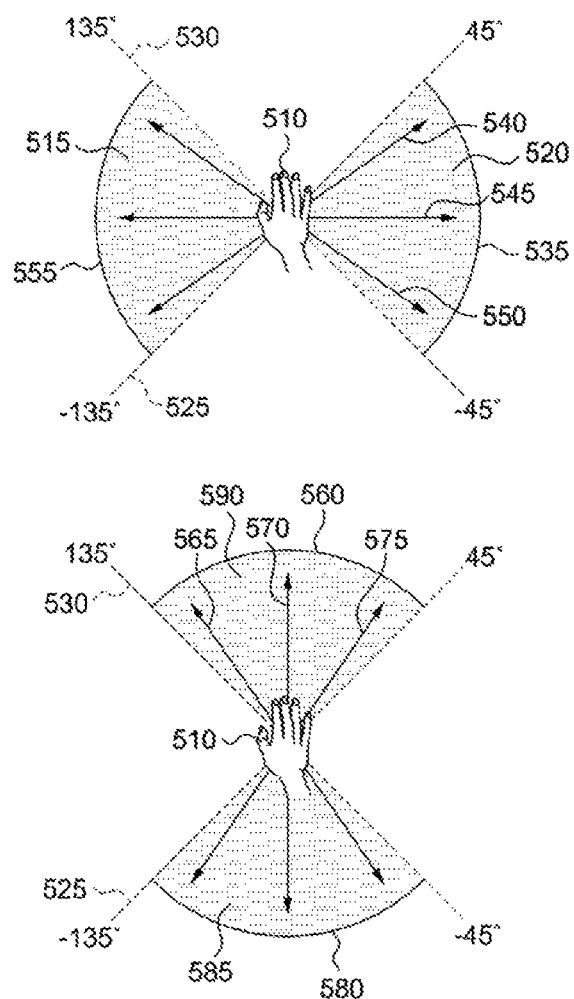
FIG. 5 is a view illustrating a range of movement recognition in vertical and horizontal directions, according to an exemplary embodiment.

FIG. 5 illustrates a range of perceiving a movement in response to a movement of the object in vertical and horizontal directions, according to an exemplary embodiment. Dotted lines 530, 525 cross each other. Dotted lines 530, 525 are at 90 degrees of angle. As the object 510 moves to regions 515, 545 defined within the dotted lines 530, 525 crossing each other, the control unit may perceive the movement in horizontal direction. By way of example, if the object moves in a direction falling to a range of +45 degrees and −45 degrees and +135 degrees and −135 degrees with respect to the x-axis direction 545, the control unit may perceive that the object moves in the horizontal direction. That is, the control unit may perceive the movement of the object 510 in horizontal direction if the object 510 moves to directions 540, 545 and 550.

Further, the dotted lines 530, 515 cross each other at an angle of 90 degrees. Regions 590, 585 are defined within the dotted lines 530, 515 crossing each other. By way of example, if the object moves in a direction falling to a range 560 of +45 degrees and +135 degrees and a range (580) of −135 degrees and −45 degrees with respect to the x-axis direction 545, the control unit may perceive that the object moves in the vertical direction. That is, the control unit may perceive the movement of the object 510 in vertical direction if the object 510 moves within regions 590, 585. For example, the control unit may perceive the movement of the object 510 to be in vertical direction if the object 510 moves to directions 565, 570, 575.

Figure 6:
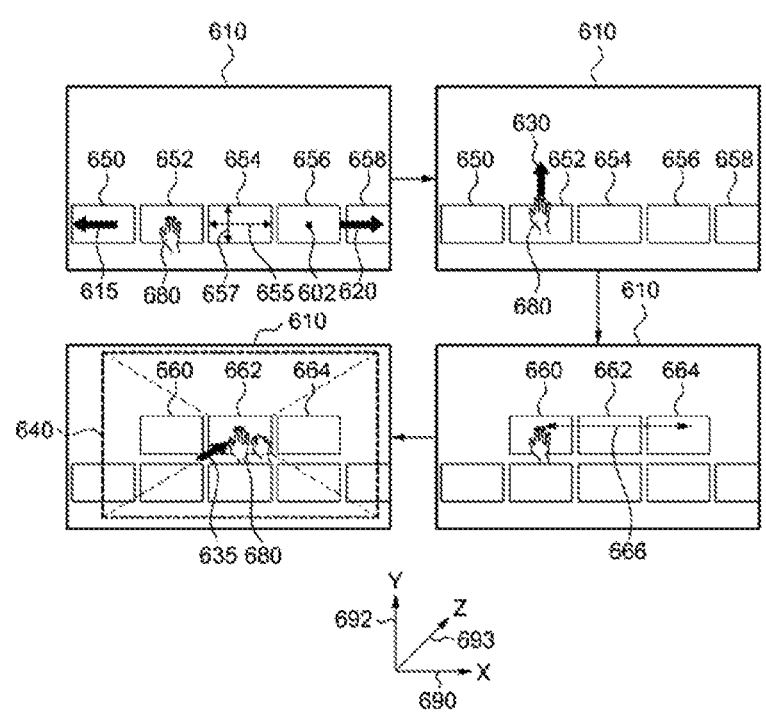
FIG. 6 is a view illustrating an example of a screen on which a plurality of items is arranged one-dimensionally on a lower portion, according to an exemplary embodiment.

FIG. 6 illustrates an exemplary screen on which a plurality of items is arranged one-dimensionally on a lower portion, according to an exemplary embodiment. Referring to FIG. 6 and also FIG. 2, a plurality of items is displayed on the screen 610. That is, a plurality of items 650, 652, 654, 656, 658 is arranged one-dimensionally on the screen 610. For example, the control unit may display the plurality of items 650, 652, 654, 656, 658 in an one-dimensional arrangement in x-axis direction. Referring to FIG. 2, the object 680 may be the hand 270 of the user, and at a predetermined distance from the screen in z-axis direction. The object 680 may move in x-, y- or z-axis direction. The control unit may measure the movement of the object 680 in at least one of x-, y- and z-axis directions. The control unit may provide visual feedback with respect to at least one item, if the movement of the object 680 is measured to be in the arrangement direction of the plurality of items 650, 652, 654, 656, 658 and within the predetermined angle. By way of example, the control unit may provide the visual feedback by highlighting the item 652. The control unit determines whether or not the plurality of items 650, 652, 654, 656, 658 on the screen is in horizontal direction 690 or vertical direction 692. That is, the control unit determines whether the plurality of items 650, 652, 654, 656, 658 is arranged in x-axis direction 690 or y-axis direction 692.

The control unit also may determine if the movement of the object 680 is in x-axis direction 690 or y-axis direction 692. If the arrangement is in x-axis direction and if the object 680 moves in a direction that falls within a predetermined angle with respect to the x-axis direction, the control unit may provide the visual feedback regarding the corresponding movement. By way of example, if the user moves his hand in x-axis direction, the control unit may cause a cursor to be displayed on the screen or at least one 680 of the plurality of items 650, 652, 654, 656, 658 to be highlighted in response to such movement.

In one example, as illustrated in FIG. 5, the predetermined angle may include a range 535 of +45 and −45 degrees and a range 555 of +135 and −135 degrees with respect to the direction where the items are arranged. The control unit may also control so that the at least one item is selected if the arrangement is in x-axis direction and if the movement of the object 680 deviates from the predetermined angle with respect to x-axis direction. By way of example, if the user moves his hand in y-axis direction in a state that the item 680 is highlighted, the control unit may control so that the highlighted item 680 is selected in response to such movement.

The control unit may provide visual feedback on the screen in response to the movement of the object 680. Providing the visual feedback may include indicating a cursor on the screen, and highlighting a specific item. By way of example, the control unit may display a cursor 602 on the screen in response to the object. The movement of the object 680 may be expressed as the movement of the cursor on the screen. The cursor may move on the screen according to the movement of the object. That is, the cursor 602 may move on the screen in accordance with the movement of the object 680. Further, the control unit may provide the visual feedback by highlighting at least one 652 of the plurality of items 650, 652, 654, 656, 658 displayed on the screen. The highlighting may move among the items according to the movement of the object 680. For example, if the object 680 moves in +x-axis direction 658 in a state that the item 652 is highlighted, the item 652 is displayed in a normal state and the item 654 is highlighted. If the object 680 keeps moving in the +x-axis direction 658, the item 654 is displayed in normal state and the item 656 is highlighted. The visual feedback may include indicating with a cursor, highlighting an item, changing a size of the item, or changing the color of the item.

If the object 680 moves in a direction 630 to deviate from the predetermined angle with respect to the direction of arrangement of the items, the control unit may perceive that the highlighted item 652 is selected. If the user moves his hand in a vertical direction, the control unit may select the item for which the visual feedback is provided. For example, if the user moves his hand in the vertical direction 630, the control unit may control so that the highlighted item 652 is selected. If the highlighted item 652 is selected, the control unit may display sub-items 660, 662, 664 of the item 652 on the screen. Alternatively, the cursor may move on the screen or the sub-items 660, 662, 664 may be highlighted in sequence in accordance with the movement of the object 680 in the arrowed direction 666.

The control unit may perceive that the sub-item 662 is selected if the object moves in z-axis direction 635, 693 on the sub-item 662, and thus cause the content 640 corresponding to the sub-item 662 to be displayed in enlargement.

Further, the control unit may select at least one item if changes in the movement of the object are maintained within a predetermined value for a predetermined time since the time the visual feedback is provided. The predetermined value may include a width 655 and a height 657 of the item (e.g., item 654) on the screen. However, with reference to the movement of the object 680, the predetermined value may apply as a threshold to change the location at which the item displayed on the screen is highlighted. For example, if the movement of the object 680 is within 5 cm, no reaction may occur on the screen. That is, the control unit may not change the location at which the item on the screen is highlighted, if the object 680 is moved within 5 cm. However, 5 cm is only one example and can be changed according to a need of a designer. Further, if the cursor 602 displayed on the screen is moved in response to the movement of the object 680 for a distance within the width 655 and the height 657 of the item 656 for a predetermined time, the control unit may control so that the item for which the visual feedback is provided is selected, and the next operation related to the selected item is carried out. For example, if the movement on the screen in response to the movement of the object 680 is maintained at values less than the width and the height of the item 652 for three seconds, the control unit may perceive that the item 652 is selected and thus carry out the next operation related to the item 652. The operation related to the item 652 may include appearance of the sub-menu or playback of the content related to the item.

Further, the control unit may select at least one item if the movement of the object corresponds to a predetermined specific pattern. By way of example, if the user waves his hand which corresponds to the object 680 in a state that the visual feedback is provided for the specific item, the control unit may control so that the specific item is selected. The 'specific pattern' may include waving of a hand that corresponds to the object 680, and changing the shape of the hand such as making a fist.

Figure 7:
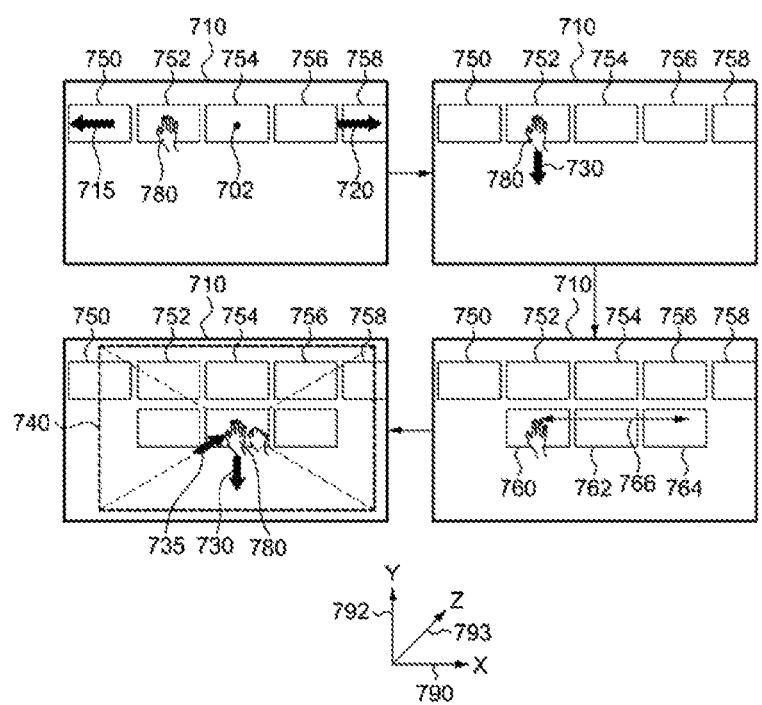
FIG. 7 is a view illustrating an example of a screen on which a plurality of items is arranged one-dimensionally on an upper portion, according to an exemplary embodiment.

FIG. 7 illustrates an exemplary screen on which a plurality of items is arranged one-dimensionally on the upper portion, according to an exemplary embodiment. Referring to FIG. 7 and also FIG. 2, a plurality of items is displayed on the screen 710. That is, the plurality of items 750, 752, 754, 756, 758 is displayed in one-dimensional arrangement on the screen 710. By way of example, the control unit may display the plurality of items 750, 752, 754, 756, 758 one-dimensionally and in x-axis direction. Referring to FIG. 2, the object 780 may be the hand 270 of the user, and at a predetermined distance from the screen in z-axis direction. The object 780 may move in x-, y- or z-axis direction. The control unit may measure the movement of the object 780 in at least one of x-, y- and z-axis directions. The control unit may provide visual feedback with respect to at least one item, if the movement of the object 680 is measured to be in the arrangement direction of the plurality of items 750, 752, 754, 756, 758 and within the predetermined angle. By way of example, the control unit may provide the visual feedback by highlighting the item 752. The control unit determines whether or not the plurality of items 750, 752, 754, 756, 758 on the screen is in horizontal direction 790 or vertical direction 792. That is, the control unit determines whether the plurality of items 750, 752, 754, 756, 758 is arranged in x-axis direction 790 or y-axis direction 792.

The control unit also may determine if the movement of the object 780 is in x-axis direction 790 or y-axis direction 792. If the arrangement is in x-axis direction and if the object 780 moves in a direction that falls within the predetermined angle with respect to the x-axis direction, the control unit may provide the visual feedback regarding the corresponding movement. By way of example, if the user moves his hand in x-axis direction, the control unit may cause a cursor to be displayed on the screen or at least one 780 of the plurality of items 750, 752, 754, 756, 758 to be highlighted in response to such movement.

In one example, as illustrated in FIG. 5, the predetermined angle may include a range 535 of +45 and −45 degrees and a range 555 of +135 and −135 degrees with respect to the direction where the items are arranged. The control unit may also control so that the at least one item is selected if the arrangement is in x-axis direction and if the movement of the object 780 deviates from the predetermined angle with respect to the x-axis direction. By way of example, if the user moves his hand in y-axis direction in a state that the item 780 is highlighted, the control unit may control so that the highlighted item 780 is selected in response to such movement.

The control unit may provide visual feedback on the screen in response to the movement of the object 780. Providing the visual feedback may include indicating a cursor on the screen, and highlighting a specific item. By way of example, the control unit may display a cursor 702 on the screen in response to the object. The movement of the object 780 may be expressed as the movement of the cursor on the screen. The cursor may move on the screen according to the movement of the object. That is, the cursor 702 may move on the screen in accordance with the movement of the object 780. Further, the control unit may provide the visual feedback by highlighting at least one 752 of the plurality of items 750, 752, 754, 756, 758 displayed on the screen. The highlighting may move among the items according to the movement of the object 780. For example, if the object 780 moves in +x-axis direction 758 in a state that the item 752 is highlighted, the item 752 is displayed in a normal state and the item 754 is highlighted. If the object 780 keeps moving in the +x-axis direction 758, the item 754 is displayed in normal state and the item 756 is highlighted. The visual feedback may include indicating with a cursor, highlighting an item, changing a size of the item, or changing the color of the item.

If the object 780 moves in a direction 730 to deviate from the predetermined angle with respect to the direction of arrangement of the items, the control unit may perceive that the highlighted item is selected. If the user moves his hand in a vertical direction, the control unit may select the item for which the visual feedback is provided. For example, if the user moves his hand in the vertical direction 730, the control unit may control so that the highlighted item 752 is selected. If the highlighted item 752 is selected, the control unit may display sub-items 760, 762, 764 of the item 752 on the screen. Alternatively, the cursor may move on the screen or the sub-items 760, 762, 764 may be highlighted in sequence in accordance with the movement of the object 780 in the arrowed direction 766.

The control unit may perceive that the sub-item 762 is selected if the object moves in z-axis direction 735, 793 on the sub-item 762, and thus cause the content 740 corresponding to the sub-item 762 to be displayed in enlargement.

Figure 8:
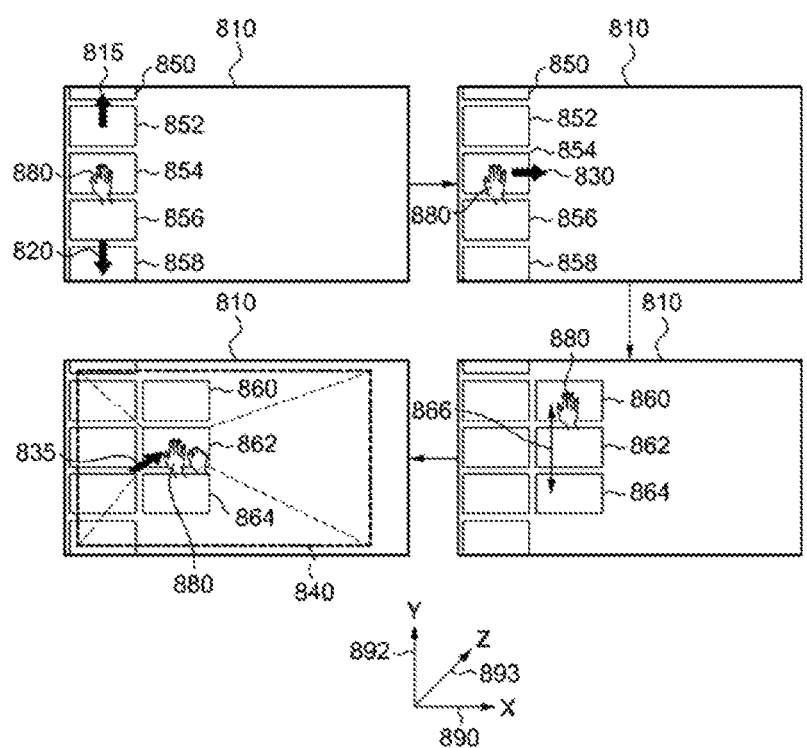
FIG. 8 is a view illustrating an example of a screen on which a plurality of items is arranged one-dimensionally on a left portion, according to an exemplary embodiment.

FIG. 8 is an exemplary screen on which a plurality of items is arranged one-dimensionally on the left portion, according to an exemplary embodiment. Referring to FIG. 8, a plurality of items 850, 852, 854, 856, 858 is displayed in y-axis direction on the screen 810. The object 880 may be a hand 270 of the user as illustrated in FIG. 2 and at a predetermined distance from the screen in z-axis direction. The control unit may provide visual feedback to the screen in response to the movement of the object 880. The control unit may display a cursor (not illustrated) on the screen, or highlight or indicate at least one of the plurality of items 850, 852, 854, 856, 858 in a brighter color, with different size or different color to provide the visual feedback.

The control unit may display a cursor on the screen 810 or highlight at least one of the plurality of items 850, 852, 854, 856, 858 if the object 880 moves in a direction that falls within a predetermined angle with respect to an x-axis direction and within a predetermined angle with respect to a y-axis direction. By way of example, the predetermined angle may include a range of +45 and +135 degrees and a range of −45 and −135 degrees with reference to the x-axis direction.

If the object 880 moves in a direction 830 that deviates from the predetermined angle with respect to the x-axis direction and the predetermined angle with respect to the y-axis direction, the control unit may perceive that an item for which the visual feedback is provided is selected. For example, the direction that deviates from the predetermined angle may correspond to a range of +45 and −45 degrees and a range of +135 and −135 degrees with reference to the x-axis direction.

For example, if the user moves his hand in the x-axis direction 830, the control unit may cause a highlighted item 852 to be selected.

If the highlighted item 852 is selected, the control unit may cause sub-items 860, 862, 864 of the selected item 852 to be displayed on the screen. A cursor may be displayed on the screen or the sub-items 860, 862, 864 may be highlighted in sequence if the user moves his hand in the arrowed direction 866.

At the sub-item 862, if the user moves his hand to the z-axis direction 835 which is a direction toward the screen, the control unit may perceive that the sub-item 862 is selected and thus display content corresponding to the sub-item 862 to be displayed 840 in enlargement.

Figure 9:
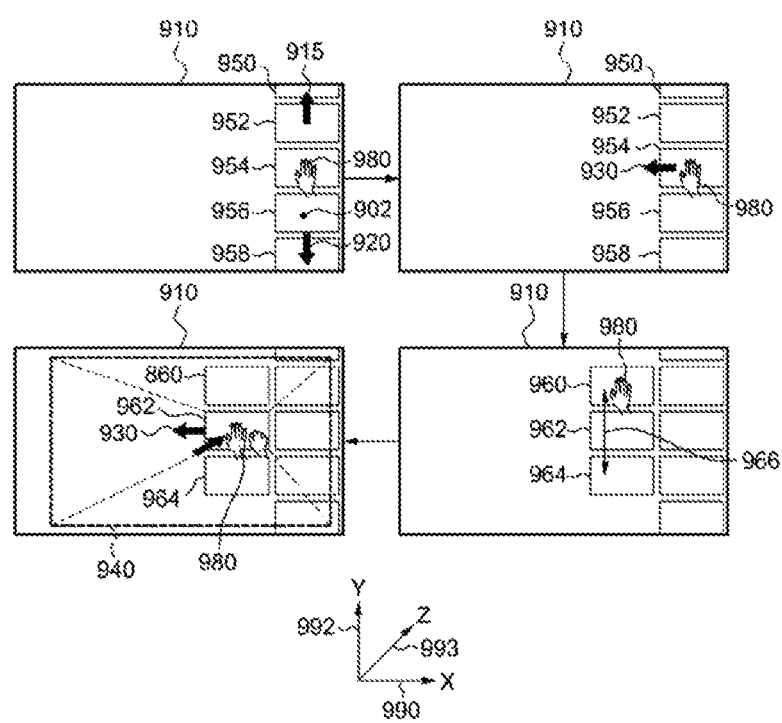
FIG. 9 is a view illustrating an example of a screen on which a plurality of items is arranged one-dimensionally on a right portion, according to an exemplary embodiment.

FIG. 9 is an exemplary screen on which a plurality of items is displayed one-dimensionally on a right portion, according to an exemplary embodiment. Referring to FIG. 9, a plurality of items 950, 952, 954, 956, 958 is displayed in y-axis direction 992 on the screen 910. The object 980 may be a hand 270 of the user as illustrated in FIG. 2 and at a predetermined distance from the screen in z-axis direction 993. The control unit may provide visual feedback to the screen in response to the movement of the object 980. The control unit may display a cursor 902 on the screen, or highlight or indicate at least one of the plurality of items 950, 952, 954, 956, 958 in a brighter color, with different size or different color to provide the visual feedback.

The control unit may display a cursor 902 on the screen 910 or highlight at least one of the plurality of items 950, 952, 954, 956, 958 if the object 980 moves in a direction that falls within a predetermined angle with respect o a y-axis direction 992. By way of example, the predetermined angle may include a range of +45 and +135 degrees and a range of −45 and −135 degrees with reference to the x-axis direction 990.

If the object 980 moves in a direction 930 to deviate from a predetermined angle with respect to a y-axis direction 992, the control unit may perceive that an item for which the visual feedback is provided is selected. For example, the direction that deviates from the predetermined angle may correspond to a range of +45 and −45 degrees and a range of +135 and −135 degrees with reference to the x-axis direction.

For example, if the user moves his hand in the x-axis direction 930, the control unit may cause a highlighted item 954 to be selected.

If the highlighted item 954 is selected, the control unit may cause sub-items 960, 962, 964 of the selected item 954 to be displayed on the screen. A cursor may be displayed on the screen or the sub-items 960, 962, 964 may be highlighted in sequence if the user moves his hand in the arrowed direction 966.

At the sub-item 962, if the user moves his hand to the z-axis direction 935 which is a direction toward the screen, the control unit may perceive that the sub-item 962 is selected and thus display content corresponding to the sub-item 962 to be displayed 940 in enlargement.

Figure 10:
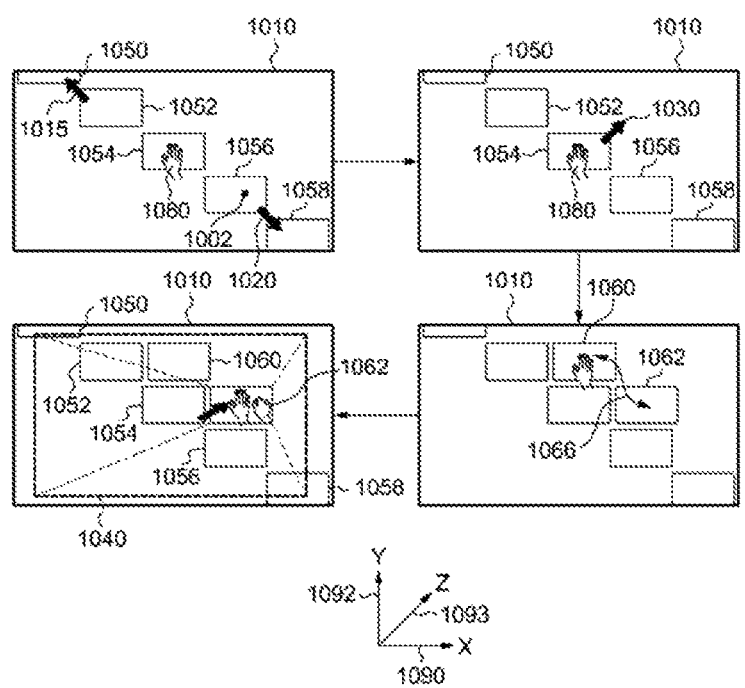
FIG. 10 is a view illustrating an example of a screen on which a plurality of items is arranged one-dimensionally in a direction from a left-upper portion to a right-lower portion, according to an exemplary embodiment.

FIG. 10 illustrates an exemplary screen on which a plurality of items is arranged one-dimensionally on a diagonal line from the left-upper portion to the right-lower portion, according to an exemplary embodiment. Referring to FIG. 10, a plurality of items 1050, 1052, 1054, 1056, 1058 is displayed diagonally on the screen 1010. As illustrated in FIG. 2, the object 1080 may be a hand 270 of the user and at a predetermined distance from the screen in z-axis direction. The control unit may provide visual feedback to the screen in response to the movement of the object 1080. The control unit may display a cursor (not illustrated) on the screen, or highlight or indicate at least one of the plurality of items 1050, 1052, 1054, 1056, 1058 in a brighter color, with different size or different color to provide the visual feedback.

The control unit may display a cursor 1002 on the screen 1010, or highlight at least one 1054 of the plurality of items 1050, 1052, 1054, 1056, 1058, if the object 1080 moves in diagonal direction 1020, 1015 and within a predetermined angle with reference to the diagonal direction. The control unit may perceive that an item for which the visual feedback is provided is selected, if the object 1080 moves in a direction 1030 to deviate from a direction perpendicular to the diagonal direction and from the predetermined angle with reference to the diagonal direction. For example, if the object 1080 moves in a direction 1030 which is perpendicular to a direction where the plurality of items is arranged, the control unit may control so that highlighted item 1054 is selected.

The control unit may display sub-items 1060, 1062 of the item 1054 to be displayed on the screen, if the highlighted item 1054 is selected. As the object moves in an arrowed direction 1066, a cursor may be displayed on the screen, or the sub-items 1060, 1062 may be highlighted in sequence.

If the object moves in z-axis direction 1093 in a state that the sub-item 1062 is highlighted, the control unit may perceive that the sub-item 1062 is selected and thus display 1040 content corresponding to the sub-item 1062 to be displayed in enlargement.

Figure 11:
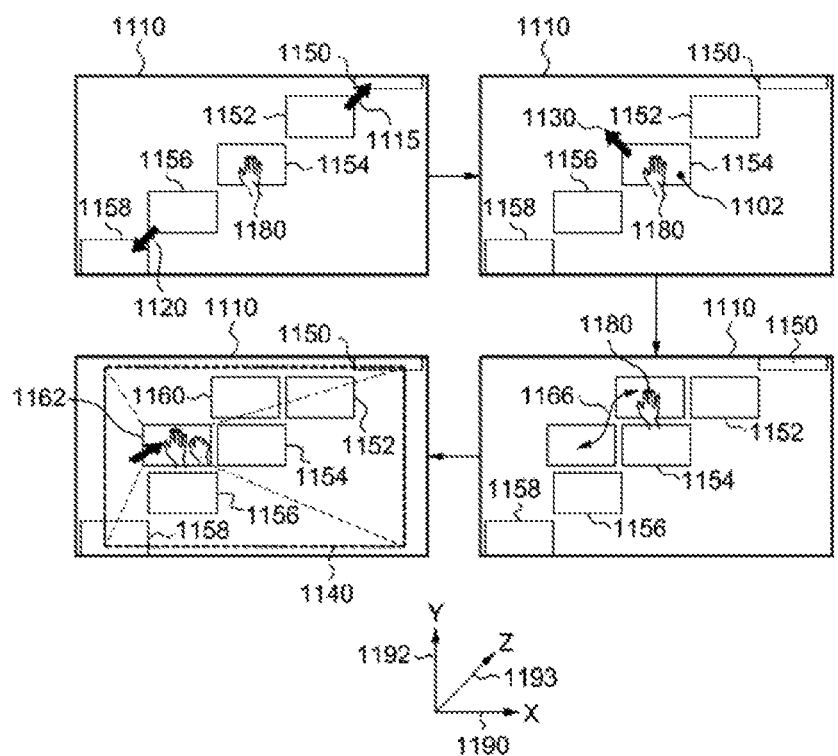
FIG. 11 is a view illustrating an example of a screen on which a plurality of items is arranged one-dimensionally in a direction from a left-lower portion to a right-upper portion, according to an exemplary embodiment.

FIG. 11 illustrates an exemplary screen on which a plurality of items is arranged one-dimensionally in a diagonal line from the right-upper portion to the left-lower portion, according to an embodiment. Referring to FIG. 11, a plurality of items 1150, 1152, 1154, 1156, 1158 is displayed diagonally on the screen 1110. As illustrated in FIG. 2, the object 1180 may be a hand 270 of the user and at a predetermined distance from the screen in z-axis direction. The control unit may provide visual feedback to the screen in response to the movement of the object 1180. The control unit may display a cursor 1102 on the screen, or highlight or indicate at least one of the plurality of items 1150, 1152, 1154, 1156, 1158 in a brighter color, with different size or different color to provide the visual feedback.

The control unit may display a cursor (not illustrated) on the screen 1110, or highlight at least one of the plurality of items 1150, 1152, 1154, 1156, 1158, if the object 1180 moves in diagonal direction 1120, 1115 and within a predetermined angle with reference to the diagonal direction. The control unit may perceive that an item for which the visual feedback is provided is selected, if the object 1180 moves in a direction 1130 to deviate from a direction perpendicular to the diagonal direction and from the predetermined angle with reference to the diagonal direction. For example, if the object 1180 moves in a direction 1130 which is perpendicular to a direction where the plurality of items is arranged, the control unit may control so that highlighted item 1154 is selected.

The control unit may display sub-items 1160, 1162 of the item 1154 to be displayed on the screen, if the highlighted item 1154 is selected. As the object moves in an arrowed direction 1166, a cursor may be moved on the screen, or the sub-items 1160, 1162 may be highlighted in sequence.

If the object moves in z-axis direction 1193 in a state that the sub-item 1162 is highlighted, the control unit may perceive that the sub-item 1162 is selected and thus display 1140 content corresponding to the sub-item 1162 to be displayed in enlargement.

Figure 12:
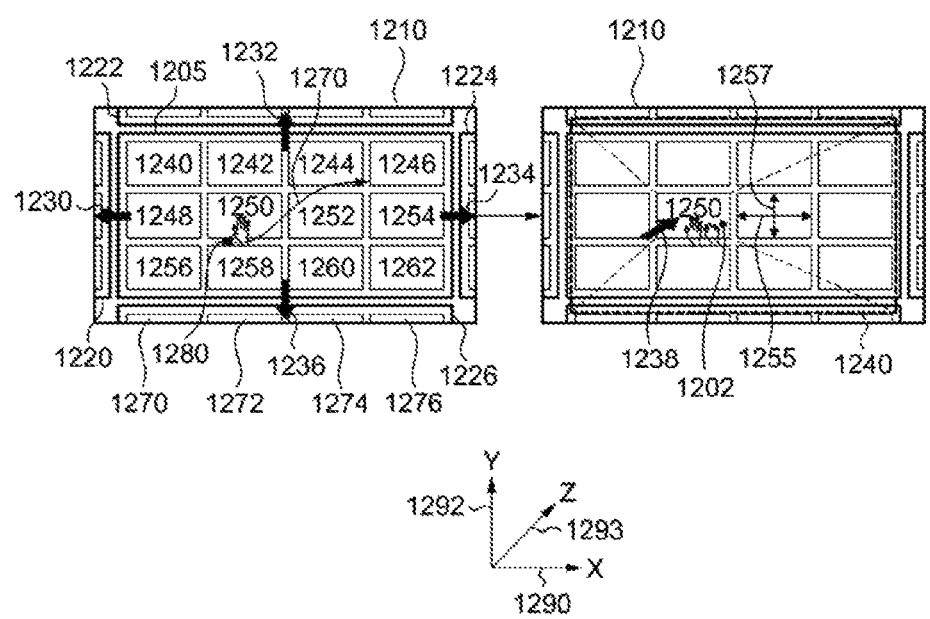
FIG. 12 is a view illustrating an example of a screen on which a plurality of items is arranged two-dimensionally, according to an exemplary embodiment.

FIG. 12 illustrates an exemplary screen on which a plurality of items is arranged two-dimensionally, according to an exemplary embodiment. Referring to FIG. 12, a plurality of items 1240, 1242, 1244, 1246, 1248, 1250, 1252, 1254, 1256, 1258, 1260, 1262 is arranged two-dimensionally on a screen 1210. The plurality of items 1240, 1242, 1244, 1246, 1248, 1250, 1252, 1254, 1256, 1258, 1260, 1262 are grouped based on one screen unit. On the upper, lower, left and right portions of the screen, some of groups 1222, 1226, 1220, 1224 of a plurality of different items from the items 1240, 1242, 1244, 1246, 1248, 1250, 1252, 1254, 1256, 1258, 1260, 1262 currently displayed on the screen are partially displayed. The groups 1222, 1226, 1220, 1224 may be may be displayed on the screen in place of the group 1205 which is currently displayed on the screen, if the object 1280 is placed on an edge of the screen. Some of a plurality of items 1270, 1272, 1274, 1276 is displayed on the group 1226 at the lower portion of the screen. If the object 1280 moves in x-axis direction 1230 or 7-1 axis direction 1232, 1236, the control unit may provide visual feedback with respect to at least one of the plurality of items 1240, 1242, 1244, 1246, 1248, 1250, 1252, 1254, 1256, 1258, 1260, 1262, and if the object moves in z-axis direction, the control unit may select at least one of the plurality of items 1240, 1242, 1244, 1246, 1248, 1250, 1252, 1254, 1256, 1258, 1260, 1262.

The control unit may perceive the hand of the user as the object 1280 if the user moves his hand. The control unit may cause a cursor 1202 to be displayed on the screen or at least one of the plurality of items 1240, 1242, 1244, 1246, 1248, 1250, 1252, 1254, 1256, 1258, 1260, 1262 to be highlighted in response to the movement of the object. The item indicated by the cursor 1202 or highlighting may be the example of the visual feedback. For example, if the object 1280 moves in the arrowed direction, the control unit may move the cursor 1202 on the screen along the arrowed direction, or change the location of the highlighted item. That is, the control unit may highlight the items 1258, 1252, 1244, 1246 in sequence. If the object moves in z-axis direction 1293, the control unit may perceive that the highlighted item is selected. The z-axis direction 1293 herein may correspond to a direction that is perpendicular to the screen plane. By way of example, if the user pushes his hand toward the screen, the control unit may perceive that the object 1280 moves in z-axis direction 1293, and thus display 1240 content corresponding to the item indicated by the cursor or highlighting on the screen. The content may include video image, still image, music, text, menu item and graphic media.

Further, the control unit may control so that at least one item is selected, if the movement of the object is maintained within a predetermined value for a predetermined time since the time the visual feedback is provided. The predetermined value may include a width 1255 and a height 1257 of the plurality of items 1240, 1242, 1244, 1246, 1248, 1250, 1252, 1254, 1256, 1258, 1260, 1262 on the screen. However, with reference to the movement of the object 1280, the predetermined value may apply as a threshold to change the location at which the item displayed on the screen is highlighted. For example, if the movement of the object 1280 is within 5 cm, no reaction may occur on the screen. That is, the control unit may not change the location at which the item on the screen is highlighted, if the object 1280 is moved within 5 cm. However, 5 cm is only one example and can be changed according to a need of a designer. Further, if the cursor 1202 displayed on the screen is moved in response to the movement of the object 1280 for a distance within the width 1255 and the height 1257 of the item 1256 for a predetermined time, the control unit may select the item for which the visual feedback is provided, and carry out the next operation related to the selected item. For example, if the movement on the screen in response to the movement of the object 1280 is maintained at values less than the width 1255 and the height 1257 of the item 1252 for three seconds, the control unit may perceive that the item 1250 is selected and thus carry out the next operation related to the item 1250. The operation related to the item 1250 may include appearance of the sub-menu or playback of the content related to the item.

Further, the control unit may select at least one item if the movement of the object corresponds to a predetermined specific pattern. By way of example, if the user waves his hand which corresponds to the object 1280 in a state that the visual feedback is provided for the specific item, the control unit may control so that the specific item is selected. The specific pattern may include waving of a hand that corresponds to the object 1280, and changing the shape of the hand such as making a fist.

Further, if the movement of the object 1280 is faster than a predetermined reference speed, the control unit may control so that another plurality of items, distinct from the current plurality of items, is displayed on the screen, and visual feedback is provided to at least one of the newly-displayed plurality of items. By way of example, if the control unit measuring the speed of the movement of the object determines that the measured movement of the object is slower than the predetermined reference speed, the control unit may control so that a cursor 1202 is moved on the screen in response to the movement of the object, or one of the plurality of items is highlighted, and the location of the highlighted item is changed in response to the movement of the object. If the movement of the object is determined to be faster than the predetermined reference speed, the currently-displayed group 1205 of the items 1240, 1242, 1244, 1246, 1248, 1250, 1252, 1254, 1256, 1258, 1260, 1262 may be replaced with another group 1220, 1222, 1224, 1226. If the object moves fast to the left side 1230, the control unit may cause the currently-displayed group 1205 to disappear and newly display the group 1224. If the object moves fast to the left side 1232, the control unit may cause the group 1205 to disappear and display the group 1226.

Figure 13:
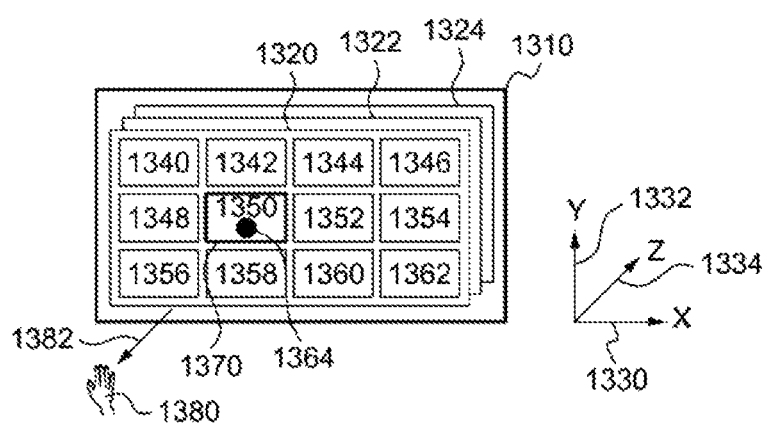
FIG. 13 is a view illustrating an example of a screen on which a plurality of items is arranged three-dimensionally, according to an exemplary embodiment.

FIG. 13 illustrates an exemplary screen on which a plurality of items is arranged three-dimensionally, according to an exemplary embodiment. Referring to FIG. 13, a plurality of items 1340, 1342, 1344, 1346, 1348, 1350, 1352, 1354, 1356, 1358, 1360, 1362 is displayed on a screen 1310 as one group 1320. Groups 1322, 1324 also include a plurality of items, respectively. The groups 1320, 1322, 1324 are arranged three-dimensionally. The group 1320 is arranged on the front on the screen, followed by the group 1322 and then lastly by group 1324. The object 1380 is at a predetermined distance 1382 from the screen 1310. The control unit may provide visual feedback to the screen as a response if the object 1380 moves. If a plurality of items is arranged three-dimensionally, the control unit may provide the visual feedback with respect to at least one of the items, if the object moves in x-axis direction 1330, y-axis direction 1332 or z-axis direction 1334. By way of example, if the object moves in x-axis direction 1330 and y-axis direction 1332, the control unit may cause a cursor 1364 to be displayed on the screen or cause at least one 1350 of the plurality of items to be highlighted 1370 and then cause the highlighted item to be relocated, in response to the movement of the object. The control unit may activate the group of a plurality of items in response to the movement of the object in the z-axis direction. The activated group may have different transparency, brightness and color than from those non-activated groups. For example, if the group 1320 is activated, the group 1320 may be displayed more non-transparently than the others 1320, 1324. If the group 1322 is activated, the group 1322 may appear less transparent than the groups 1320, 1324.

The control unit may control so that at least one item is selected if changes in the movement of the object are maintained within a predetermined value for a predetermined time since the time the visual feedback is provided, or if the movement of the object corresponds to a preset specific motion. For example, if the movement of the object 1380 is within 5 cm at a location of the highlighted item 1350, the control unit may control so that the highlighted item 1350 is selected. However, 5 cm is only one example and can be changed according to a need of a designer. Further, the control unit may carry out the next operation related to the selected item. The operation related to the item 1350 may include appearance of the submenu or playback of the content related to the item.

Further, the control unit may select at least one item if the movement of the object corresponds to a predetermined specific pattern. By way of example, if the user waves his hand which corresponds to the object 1380 in a state that a specific item 1350 is indicated by the cursor 1364 or highlighting, the control unit may control so that the specific item 1380 is selected. The 'specific pattern' may include waving of a hand, and changing the shape of the hand such as making a fist.

Figure 14:
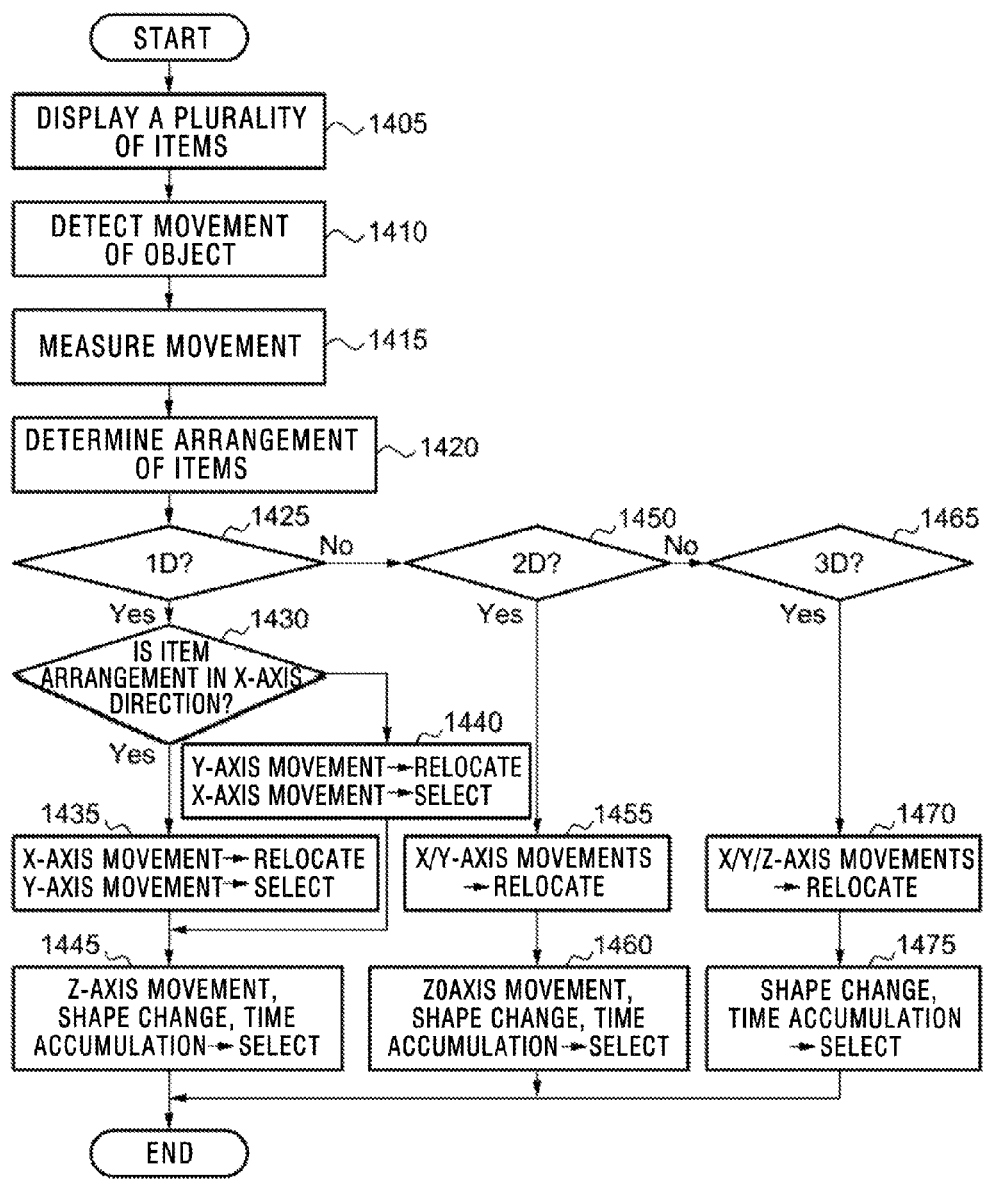
FIG. 14 is a view illustrating an exemplary process of an item selecting apparatus to select an item or provide visual feedback in response to a movement of an object inputted in a state that a plurality of items is arranged on a screen one-, two- or three dimensionally.

FIG. 14 illustrates an exemplary processing of an item selecting apparatus to select an item or to provide visual feedback in response to the movement of an object in a state that a plurality of items is displayed in one of one-dimensional, two-dimensional and three-dimensional arrangements. An exemplary embodiment will be explained in greater detail below with reference to FIGS. 2, 6 and 8 as well as FIG. 14. In one exemplary embodiment, at S1405, the item selecting apparatus may display a plurality of items in one of one-dimensional, two-dimensional and three-dimensional arrangements. At S1410, the item selecting apparatus detects a movement of the object in a state that the plurality of item is displayed on the screen. If the movement of the object may be a hand movement of the user at S1415. If the user waves his hand in front of the screen (see FIG. 2), the item selecting apparatus detects this and measures the detected movement of the object in at least one of x-axis, y-axis and z-axis directions. At S1420, the item selecting apparatus determines the arrangement of the plurality of items. In response to the measured movement of the same pattern, the item selecting apparatus may issue a command to select at least one of the plurality of items or provide visual feedback with respect to at least one of the plurality of items, depending on the arrangement of the plurality of items on the screen. For example, in response to the movement of the object in the same x-axis direction, the item selecting apparatus may select an item, move a cursor, or change the location of highlighted item depending on the arrangement of the item.

At S1425, if the plurality of items is displayed in one-dimensional arrangement, the item selecting apparatus determines whether the plurality of items is arranged in x-axis direction. If the result of determination indicates that the arrangement of the plurality of items in x-axis direction, the item selecting apparatus measures the direction of the movement of the object. The item selecting apparatus provides visual feedback with respect to the at least one item, if measuring the movement of the object within a predetermined angle with respect to a direction in which the plurality of items is arranged. By way of example, the predetermined angle with respect to the direction of arrangement may include a range 555 of +45 and −45 degrees and a range 535 of +135 and −135 degrees of angle between the direction of arrangement and the direction of the movement of the object, as illustrated in FIG. 5. The item selecting apparatus may indicate a cursor on the screen or relocate the highlighted item in response to the movement of the object. Relocating the item is illustrated in FIG. 6. Referring to FIG. 6, if the object 680 moves in the +x-axis direction 658 in a state that the item 652 is highlighted, the item selecting apparatus may highlight the item 654 in response to the movement of the object 680 and then highlight the item 656 and then the item 658. Further, the item selecting apparatus may cause the at least one item to be selected, if measuring a movement of the objection deviating from the predetermined angle with respect to the direction of arrangement. By way of example, as illustrated in FIG. 5, the direction deviating from the predetermined angle with respect to the direction of arrangement may include a range 560 of +45 and +135 degrees and a range 580 of −135 and −45 degrees of an angle between the direction of arrangement and the direction of the movement of the object. The item selecting apparatus may select the at least one item, if measuring the movement of the object in a direction to deviate from the predetermined angle with respect to the x-axis direction. By way of example, as illustrated in FIG. 6, if the plurality of items 650, 652, 654, 656, 658 is arranged in a horizontal direction (i.e., x-axis direction), the item selecting apparatus may select the item 652 if the object moves in the vertical direction 630 (i.e., y-axis direction).

In other words, at S1435, in a state that the item is arranged in x-axis direction, the movement of the object in the x-axis direction applies as a command to relocate an item and the movement of the object in the y-axis direction applies as a command to select the item.

Further, the item selecting apparatus may display a cursor on the screen or relocate a highlighted item in response to the movement of the object, if the plurality of items is arranged in y-axis direction and the movement of the object is also in y-axis direction. Relocating an item is illustrated in FIG. 8. Referring to FIG. 8, if the object 880 moves in +y-axis direction 850 in a state that the item 854 is highlighted, the item selecting apparatus highlights an item 856, and then the next item 858 in turn in response to the movement of the object 880. Further, the item selecting apparatus may cause the at least one item to be selected, if measuring the movement of the object in a direction to deviate from the predetermined angle with respect to the direction of arrangement. By way of example, the direction to deviate from the predetermined angle with respect to the direction of arrangement may include, as illustrated in FIG. 5, a range 535 of +45 and +135 degrees and a range 555 of −135 and −45 degrees of an angle between the direction of arrangement and the direction of the movement of the object. The item selecting apparatus may select the at least one item, if measuring a movement of the object in a direction to deviate from the predetermined angle with respect to the x-axis direction. By way of example, referring to FIG. 8, in a state that the plurality of items 850, 852, 854, 856, 858 is arranged in the vertical direction (i.e., y-axis direction), the item selecting apparatus may select the item 854 in response to the movement of the object in the horizontal direction 860 (i.e., x-axis direction).

In other words, at S1440, the movement of the object in y-axis direction applies as a command to relocate an item and the movement of the object in x-axis direction applies as a command to select an object, when the items are arranged in the y-axis direction. Further, the item selecting apparatus may select the at least one item, if changes in the movement of the object are maintained within a predetermined value for a predetermined time since the time the visual feedback is provided. The item selecting apparatus may also select the at least one item, if the movement of the object corresponds to a predetermined specific pattern.

At S1450, the item selecting apparatus determines if the plurality of items is arranged two-dimensionally. If determining that the plurality of items are in two-dimensional arrangement, at S1455, the item selecting apparatus provides visual feedback with respect to the at least one item if the movement of the object is in x-axis and y-axis directions. At S1460, the item selecting apparatus selects the at least one item, if the movement of the object is in z-axis direction. At S1460, if changes in the movement of the object are maintained within a predetermined value for a predetermined time since the time of providing the visual feedback, the item selecting apparatus selects the at least one item. The predetermined value herein may include a length and a width of the item. In one example, the predetermined time may be three seconds. That is, if changes on the screen in response to the movement of the object are maintained within the length and width of the item for three seconds, the item selecting apparatus may perceive that the corresponding item is selected. At S1460, the item selecting apparatus may control so that the at least one item is selected, if the movement of the object corresponds to the predetermined specific pattern.

At S1465, the item selecting apparatus determines if the plurality of items is displayed in three-dimensional arrangement. At S1470, if the plurality of items is displayed in three-dimensional arrangement, the item selecting apparatus provides visual feedback with respect to the at least one item if the movement of the object is in x-, y- or z-axis direction. At S1475, if changes in the movement of the object are maintained within a predetermined value for a predetermined time since the time of providing the visual feedback, or at S1475, if the movement of the object corresponds to the predetermined specific pattern, at S1475, the item selecting apparatus may control so that the at least one item is selected.

The methods explained above may be implemented in the from of program commands executable through a variety of computing means and recorded on a computer-readable medium. The computer-readable medium may include program command, data file, and data structure singularly or in combination. The program commands recorded on the medium may be specifically designed for an exemplary embodiment, or those that are known and available for those skilled in the art in the computer software field. Examples of the computer-readable medium may include magnetic media such as hard disk, floppy disk and magnetic tapes, optical media such as CD-ROM or DVDs, magneto-optical media such as floptical disks, or hardware devices such as ROMs, RAMs and flash memories which are specifically constructed to store and execute program commands. Examples of the program commands may include not only machine code created by the compilers, but also high level language code executable by the computer using interpreter or the like. The hardware devices may be implemented as one or more software modules to carry out the operation of an exemplary embodiment, or vice versa.

The foregoing exemplary embodiments and advantages are merely exemplary and are not to be construed as limiting the present invention. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

What is claimed is:

1. An item selecting apparatus comprising:
    a display screen to display a plurality of items;
    an image sensor which captures an image of an object;
    an object analyzer which analyzes a position and a shape of the object in the image and determines the shape of the object; and
    a controller which controls the plurality of items to be displayed on the display screen in one of one-dimensional, two-dimensional, and three-dimensional arrangements,
    wherein in response to the analysis of the position and the shape of the object, if a movement of the object is slower than or equal to a predetermined reference speed, the controller controls at least one of the displayed plurality of items, corresponding to the position of the object, to be highlighted,
    wherein if the movement of the object is faster than the predetermined reference speed, the controller controls the display screen to display another plurality of items by replacing the displayed plurality of items with the another plurality of items,
    wherein if the displayed plurality of items is arranged in the one-dimensional arrangement and the movement of the object is within a predetermined angle with respect to a direction of the one-dimensional arrangement, the controller outputs a command corresponding to a visual feedback with respect to at least one item of the displayed plurality of items,
    wherein if the displayed plurality of items is arranged in the one-dimensional arrangement and the movement of the object is not within the predetermined angle, the controller outputs the command corresponding to the selection or the activation of the at least one item, and
    wherein if changes in the movement of the object are maintained within a predetermined time from a time of outputting the command corresponding to the visual feedback, the controller outputs the command corresponding to the selection or the activation of the at least one item.

2. The item selecting apparatus of claim 1, wherein if the displayed plurality of items is arranged in the three-dimensional arrangement, the controller outputs a command corresponding to a visual feedback with respect to the at least one item in response to the movement of the object,
    wherein if changes in the movement of the object are maintained within a predetermined time from a time of the outputting of the command corresponding to the visual feedback, the controller outputs the command corresponding to the selection or the activation of the at least one item, and
    wherein if the movement of the object corresponds to a predetermined specific pattern, the controller outputs the command corresponding to the selection or the activation of the at least one item.

3. The item selecting apparatus of claim 1, wherein it is determined that the shape of the object is changed, the controller outputs a command for the at least one of the displayed plurality of items.

4. The item selecting apparatus of claim 1, wherein the object analyzer further measures the movement of the object in at least one of x-axis, y-axis and z-axis directions.

5. The item selecting apparatus of claim 1, wherein if the movement of the object corresponds to a predetermined pattern, the controller outputs the command corresponding to the selection or activation of the at least one item.

6. The item selecting apparatus of claim 1, wherein if the visual feedback is arranged on an edge of the display screen and if the movement moves toward the edge of the display screen, the controller controls the display screen to display a second plurality of items, and the controller outputs a command corresponding to second visual feedback with respect to at least one of the displayed second plurality of items.

7. The item selecting apparatus of claim 1, wherein if the displayed plurality of items is arranged in the two-dimensional arrangement and the movement of the object is in x-axis and y-axis directions, the controller outputs a command corresponding to a visual feedback with respect to at least one item of the displayed plurality of items, and wherein if the displayed plurality of items is arranged in the two-dimensional arrangement and the movement of the object is in a z-axis direction, the controller outputs the command corresponding to the selection or the activation of the at least one item.

8. The item selecting apparatus of claim 7, wherein if changes in the movement of the object are maintained within a predetermined time from a time of outputting the command corresponding to the visual feedback, the controller outputs the command corresponding to the selection or the activation of the at least one item.

9. The item selecting apparatus of claim 7, wherein if the movement of the object corresponds to the predetermined specific pattern, the controller outputs the command corresponding to the selection or the activation of the at least one item.

10. The item selecting apparatus of claim 1, wherein when a direction of the movement of the object and a direction of at least one of the displayed plurality of items are at right angle, the controller outputs a command for a selection the at least one of the displayed plurality of items.

11. The item selecting apparatus of claim 1, wherein the controller outputs a visual feedback with respect to at least one of the displayed plurality of items, when outputting the command for selection or activation of at least one of the displayed plurality of items.

12. A method for selecting at least one item from among a plurality of items displayed on a display screen, the method comprising:

displaying a plurality of items on the display screen in one of one-dimensional, two-dimensional, and three-dimensional arrangements;

capturing an image of an object;

analyzing a position and a shape of the object in the image and determining a shape of the object, and in response the analysis of the position and the shape of the object, if a movement of the object is slower than or equal to a predetermined reference speed, controlling at least one of the displayed plurality of items, corresponding to the position of the object, to be highlighted, and if a movement of the object is faster than the predetermined reference speed, controlling the display screen to display another plurality of items by replacing the displayed plurality of items with the another plurality of items, wherein if the displayed plurality of items is arranged in the one-dimensional arrangement and the movement further comprises one of:

providing a visual feedback with respect to at least one item of the displayed plurality of items, if the movement of the object is in a direction that falls within a predetermined angle with respect to a direction of arrangement, and selecting or activating the at least one item if the movement of the object is in a direction that deviates from the predetermined angle with respect to the direction of arrangement, and wherein the method further comprises selecting or activating the at least one item if changes in the movement of the object are maintained within a predetermined time for a time of providing the visual feedback.

13. The method of claim 12, further comprising selecting or activating the at least one item if the movement of the object corresponds to a predetermined specific pattern.

14. The method of claim 12, further comprising, if the visual feedback is provided with respect to one of the displayed plurality of items which is arranged on an edge of the display screen and if the movement moves toward the edge of the display screen, displaying another set of plurality of items distinct from the said displayed plurality of items on the display screen, and providing the visual feedback with respect to at least one of the displayed plurality of items of the another set.

15. The method of claim 12, wherein if the displayed plurality of items is arranged in the two-dimensional arrangement, the method further comprises:

providing a visual feedback with respect to at least one item of the plurality of items, if the movement of the object is in x-axis and y-axis directions; and selecting or activating the at least one item if the movement of the object is a z-axis direction.

16. The method of claim 15, further comprising selecting or activating at least one item if changes in the movement of the object are maintained within a predetermined time from a time of providing the visual feedback.

* * * * *